United States Patent [19]

Nishimura et al.

[11] Patent Number: 5,517,607
[45] Date of Patent: May 14, 1996

[54] GRAPHIC PROCESSING APPARATUS UTILIZING A CAD SYSTEM

[75] Inventors: Naoki Nishimura; Yoichi Yamada; Akira Katoh, all of Kawasaki, Japan

[73] Assignee: Fujitsu Limited, Kawasaki, Japan

[21] Appl. No.: 291,053

[22] Filed: Aug. 15, 1994

Related U.S. Application Data

[63] Continuation of Ser. No. 953,120, Sep. 29, 1992, abandoned.

[30] Foreign Application Priority Data

Sep. 30, 1991 [JP] Japan .................................. 3-251181

[51] Int. Cl.$^6$ ..................................................... G06F 19/00
[52] U.S. Cl. ............................................. 395/160; 395/157
[58] Field of Search .................................... 395/119, 120, 395/155–161, 600, 650

[56] References Cited

U.S. PATENT DOCUMENTS

| | | | |
|---|---|---|---|
| 5,023,800 | 7/1991 | Carver et al. | 364/474.24 |
| 5,111,413 | 5/1992 | Lazansky et al. | 364/578 |
| 5,193,185 | 3/1993 | Lanter | 395/600 |
| 5,201,046 | 4/1993 | Goldberg et al. | 395/600 |
| 5,224,055 | 7/1993 | Grundy et al. | 364/488 |

*Primary Examiner*—Mark R. Powell
*Assistant Examiner*—Ba Huynh
*Attorney, Agent, or Firm*—Staas & Halsey

[57] ABSTRACT

A graphic data processor employs a CAD system having an input part, a design model managing part and a display part. The design model managing part includes a model area creating unit for securing a model area and formatting the model area into function figures, layers, figure groups, and figures, a model accessing unit for accessing the model area and an external file, a model data retrieving unit for hierarchically retrieving data from the model area and a model updating unit for creating model information and correcting figure information.

7 Claims, 22 Drawing Sheets

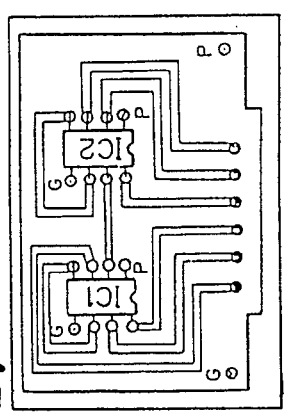
Fig. 8(B) PRINT BOARD FIGURE
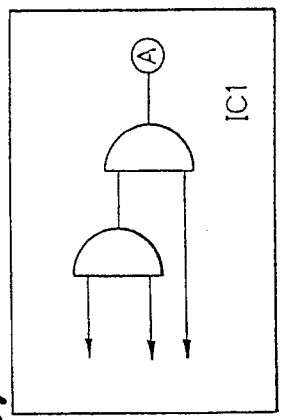
Fig. 8(C) CIRCUIT FIGURE
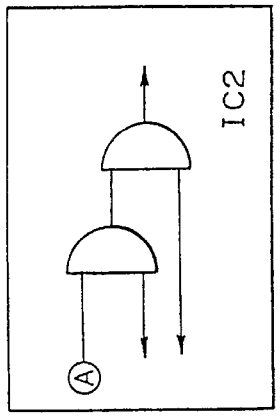
Fig. 8(D) CIRCUIT FIGURE
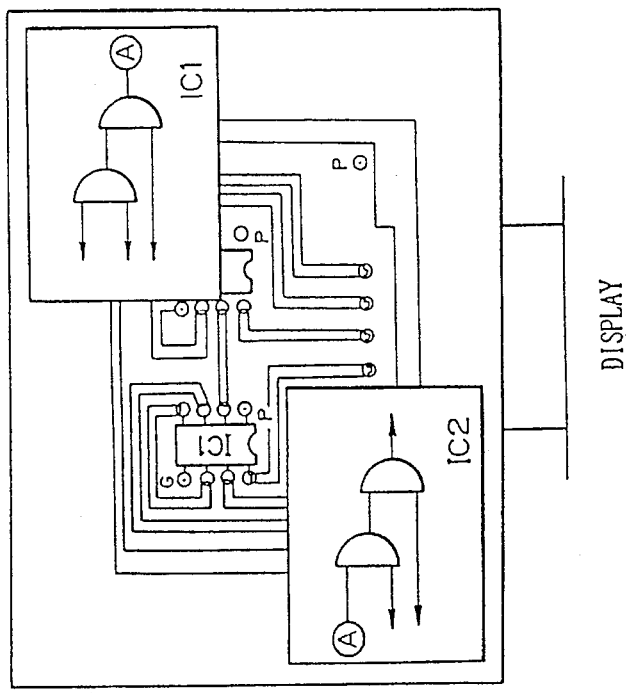
Fig. 8(A)
DISPLAY

PRINT BOARD; FIGURE
40

LAYER 1

PART LAYER

41

42

LAYER 2

WIRING LAYER

43

LAYER 3

RESIST LAYER (SOLDER PORTION)

44

LAYER 4

RESIST LAYER (HOLE PORTION)

45

LAYER 5

LETTER LAYER

46

LAYER 6

OUTER·LAYER

<DISPLAY IMAGE BEFORE ENLARGED>

<DISPLAY IMAGE AFTER ENLARGED>

<BEFORE PANNING>

<AFTER PANNING>

<BEFORE DELETION>

<AFTER DELETION>

Fig. 16(A)
TUBE LAYER
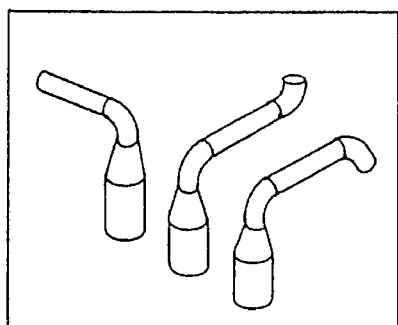
FIGURE GROUP 1　　　FIGURE GROUP 2　　　FIGURE GROUP 3
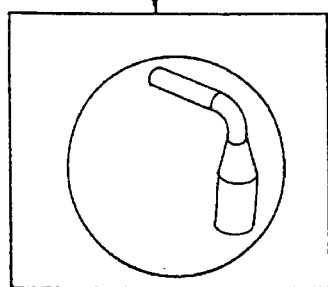 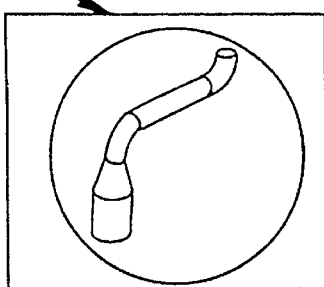 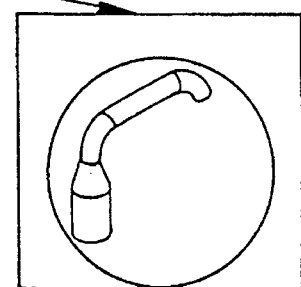
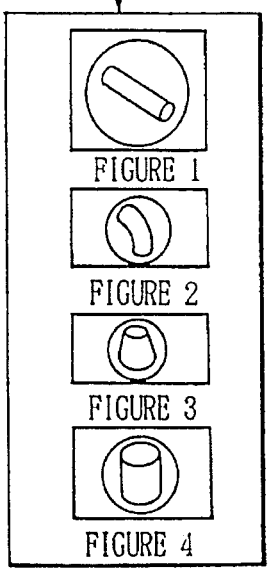
Fig. 16(B)
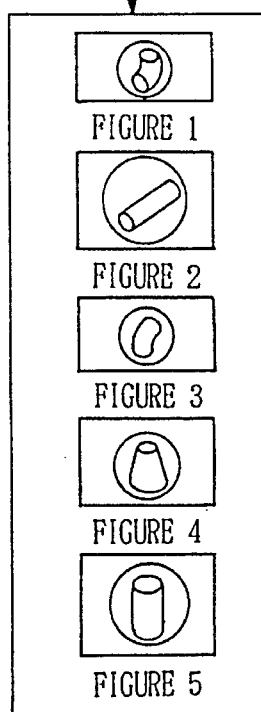
Fig. 16(C)
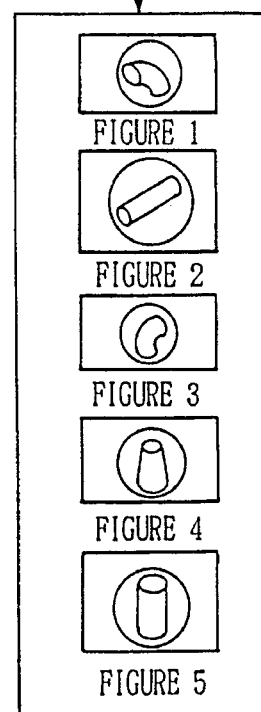
Fig. 16(D)

Fig. 18 (A)

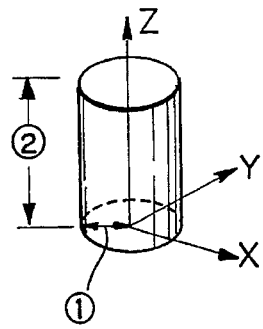

Fig. 18 (B)

| FIGURE AREA MASK | | |
|---|---|---|
| PRIMITIVE LENGTH | | TYPE |
|  |  |  |
|  |  |  |
|  |  |  |
|  |  |  |
| Reserved | | |
| X-COORDINATE ON 3-DIMENSIONAL SPACE FOR PEAK OF DEFINED COORDINATE | | |
| Y-COORDINATE ON 3-DIMENSIONAL SPACE FOR PEAK OF DEFINED COORDINATE | | |
| Z-COORDINATE ON 3-DIMENSIONAL SPACE FOR PEAK OF DEFINED COORDINATE | | |
| X-COMPONENT OF UNIT VECTOR FOR Z-AXIS OF DEFINED COORDINATE | | |
| Y-COMPONENT OF UNIT VECTOR FOR Z-AXIS OF DEFINED COORDINATE | | |
| Z-COMPONENT OF UNIT VECTOR FOR Z-AXIS OF DEFINED COORDINATE | | |
| X-COMPONENT OF UNIT VECTOR FOR X-AXIS OF DEFINED COORDINATE | | |
| Y-COMPONENT OF UNIT VECTOR FOR X-AXIS OF DEFINED COORDINATE | | |
| Z-COMPONENT OF UNIT VECTOR FOR X-AXIS OF DEFINED COORDINATE | | |
| RADIUS OF REFERENCE CIRCLE OF COLUMN | | |
| HIGHT OF COLUMN | | |

ATTRIBUTE / GEOMETRIC INFORMATION

R>0.0         ①

HEIGHT ≠ 0.0  ②

PRINT BOARD FIGURE

CIRCUIT FIGURE

CIRCUIT FIGURE

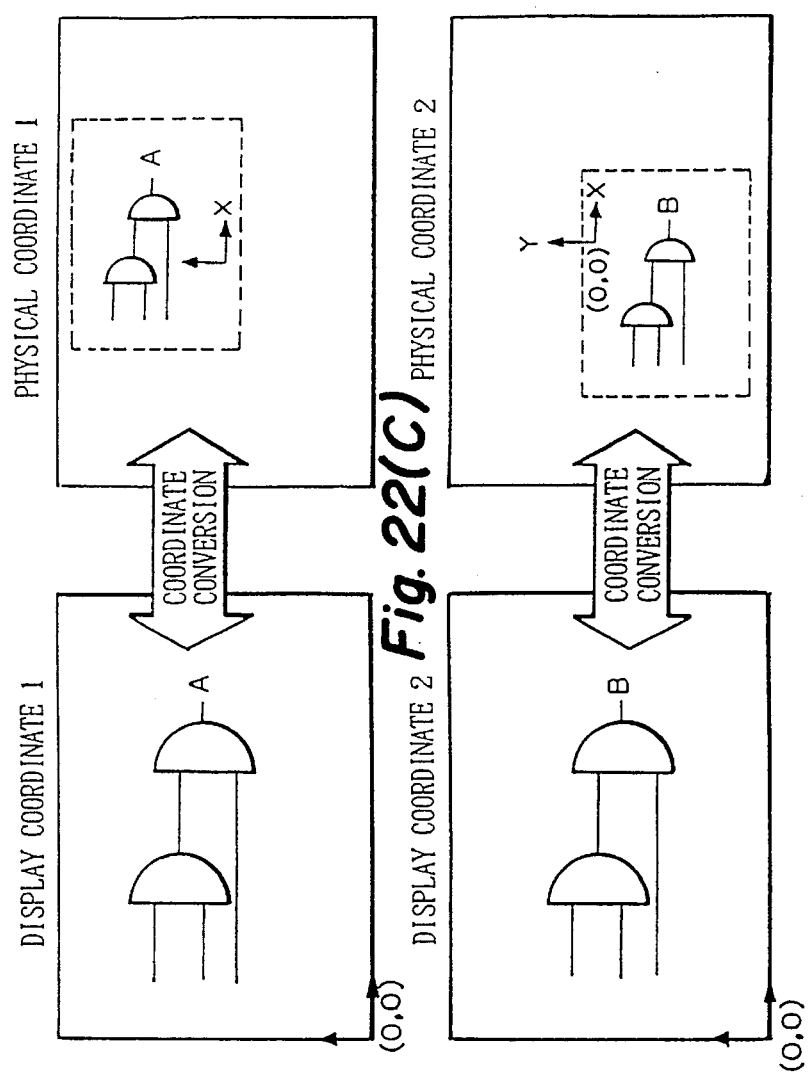
Fig. 22(B)
Fig. 22(C)
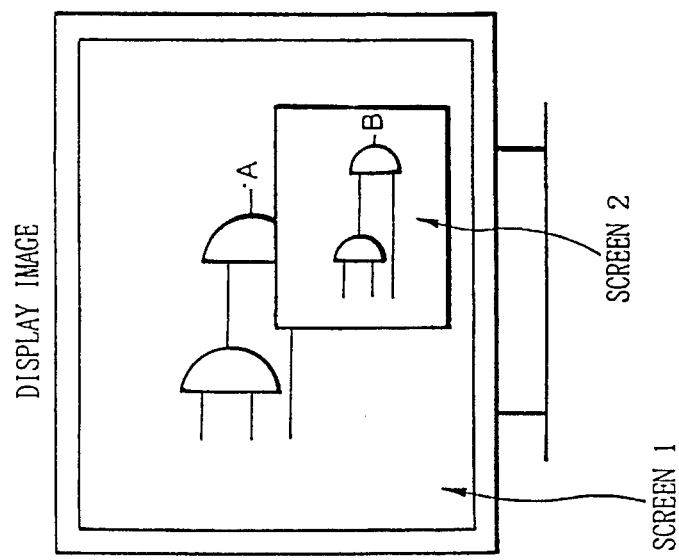
Fig. 22(A)

GRAPHIC PROCESSING APPARATUS UTILIZING A CAD SYSTEM

This application is a continuation of application Ser. No. 07/953,120, filed Sep. 29, 1992, now abandoned.

BACKGROUND OF THE INVENTION

1. Field of the Invention

The present invention relates to a graphic data processor such as a product designing apparatus employing a CAD (Computer Aided Design) system, and particularly, to a graphic data processor that processes product design models at high speed.

2. Description of the Related Art

CAD systems are widely used for products designing in various fields including electric, machinery, and building industries.

The CAD systems usually employ a host computer, color display units, work stations, printers, and input devices such as keyboards and mouse.

The CAD systems are useful in designing and manufacturing various kinds of products in small quantities. The CAD systems must quickly carry out various tasks such as displaying one of the different products, partly redesigning the product, and preparing a new design model.

SUMMARY OF THE INVENTION

An object of the present invention is to provide a graphic data processor, which is used with a CAD system for designing products and enables a user to check, correct, and change the whole of a product design model in a short time.

To achieve the object, a graphic data processor employing a CAD system according to the present invention comprises input means, model managing means, and display means.

The input means receives an instruction through input devices.

The model managing means comprises includes a model area creating unit, a model accessing unit, a model data retrieving unit, and a model updating unit.

The model area creating unit secures a model area for holding a product design model, composed of hierarchical figures, and formats the model area into top layers (function figures), lower layers included in each of the top layers, figure groups included in each of the lower layers, and figures included in each of the figure groups. Each of the figures involves a figure area mask, attributes, geometric information, and letter train information.

The model accessing unit fetches an existing design model from an external storage unit and puts it in the formatted model area in a single access operation, or transfers data from the model area to the external storage unit in a single access operation.

The model data retrieving unit retrieves data units from the formatted hierarchical data in the model area.

The model updating unit adds new function figures, layers, area masks, attributes, geometric information, and letter train information to the formatted model area, and corrects a product design model fetched by the model accessing unit.

The display means has buffering means for buffering data from the model managing means according to the colors, kinds, and characteristics of the data in order to display the data with minimum access time.

The structure of the model area corresponds to the structure of design model data stored in the external storage unit. The above three means cooperate with one another to create a design model and correct an existing design model at high speed.

Each of the figure groups has a header involving a figure group area mask having coordinates specifying the position of the figure group. Each of the figures has a header involving a figure area mask having coordinates specifying the position of the figure.

The display means provides multiple windows for displaying all of the formatted data.

The model data retrieving unit retrieves data from the model area by searching the figure group area masks and figure area masks in the model area.

A two-dimensional figure in the model area is specified with two diagonal corner points (x1, y1) and (x2, y2) of a rectangle that includes the two-dimensional figure.

A three-dimensional figure in the model area is specified with the center (x, y, z) and radius (r) of a sphere that includes the three-dimensional figure.

BRIEF DESCRIPTION OF THE DRAWINGS

FIGS. 8 (A) through 8 (D) are views explaining a design model according to the present invention;

FIGS. 16 (A) through 19 (D) are views showing a three-dimensional figure including figure group area masks and figure area masks;

FIGS. 18

Figure 20:
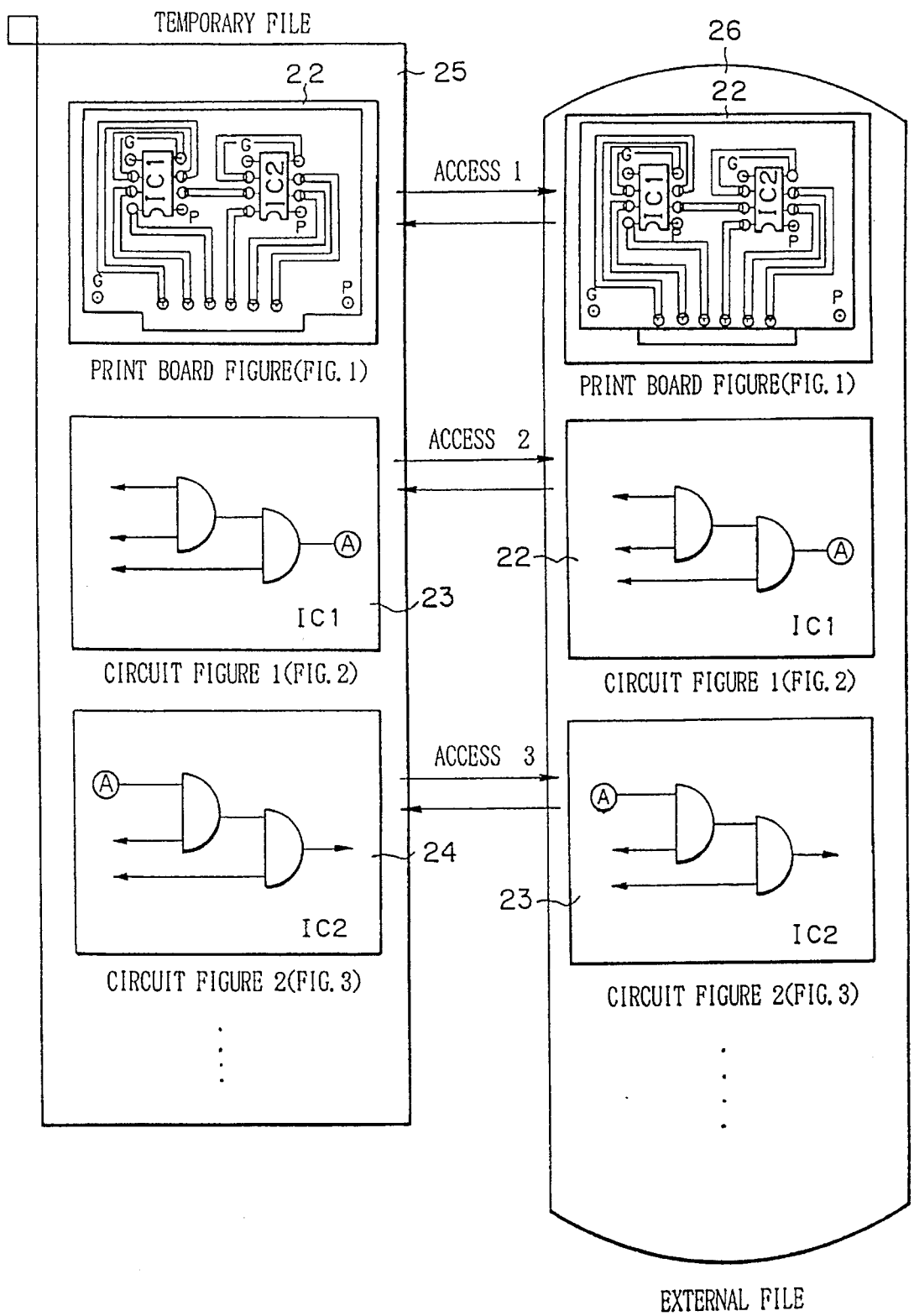
Figure 21:
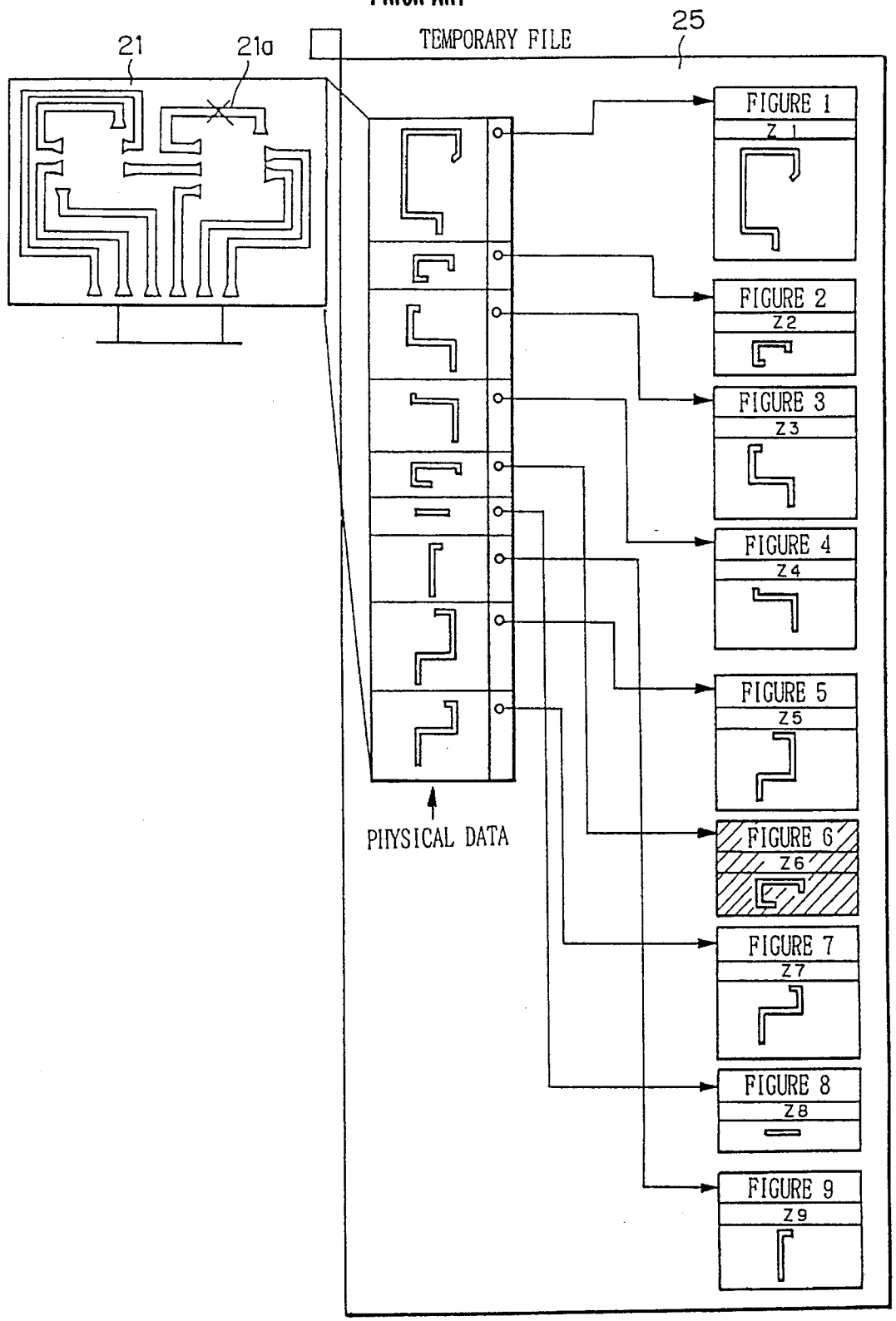

(A) and 18 (B) are views explaining a data format for a three-dimensional figure according to the embodiment;

FIGS. 19 (A) through 19 (D) are views explaining a display screen according to a prior art;

FIG. 20 is a view showing relations between a temporary file and an external file according to the prior art;

FIG. 21 is a view explaining access to figure data according to the prior art; and FIGS. 22 (A) through 22 (C) are views explaining conversions between display coordinates and physical coordinates.

DESCRIPTION OF THE PREFERRED EMBODIMENTS

For a better understanding of the preferred embodiments of the present invention, the problems in the prior art will be explained with reference to FIGS. 19 to 21.

FIGS. 19 (A) through 19 (D) show a display unit 21 of a graphic data processor according to the prior art. A function figure displayed on the display unit 21 forms part of a product design model and is used to check the design model. According to the prior art, the display unit 21 displays only one figure such as the figure of a printed board 22 at a time. To display an IC circuit 23 or 24 disposed on the printed board 22, one must delete the printed board 22 from the display unit 21 and display the required IC circuit. In this way, a new figure is displayable only after the deletion of the present figure. To create a design model or to correct an existing design model, function figures are displayed only one by one.

FIG. 20 shows relations between a temporary file 25 and an external file 26, according to the prior art. Existing product data to be displayed is read out of the external file 26 and is temporarily stored in the temporary file 25. It is possible to transfer data from the temporary file 25 to the external file 26. In both the cases, data is handled with a function figure as a unit. If a product design model involves many function figures, many access operations must be done between the temporary file 25 and the external file 26.

FIG. 21 shows access to figure data stored in the temporary file 25, according to the prior art. The prior art retrieves a figure from the data stored in the temporary file 25 by comparing the coordinates of a point 21a specified on the display unit 21 with the physical coordinates of every figure stored in the temporary file 25. As the number of figures in the temporary file 25 increases, a longer retrieving time will be needed. Namely, it takes a long time after a figure to be processed is specified until the figure is displayed.

In this way, the graphic data processor according to the prior art is incapable of displaying the whole of a design model and takes a long time to retrieve a required figure from the design model. Accordingly, product designing according to the prior art takes a long time to complete.

In summary, the prior art has the following problems:

(a) Frequent screen operations including the partial enlargement, panning, and switching of figures take a long time to extend a wait time between operations.

(b) Function figures must be displayed and checked one by one.

(c) It is impossible to display the whole of a product. Namely, it is impossible to collectively observe all corrections made on the product.

(d) It is necessary to access the external storage unit whenever a function figure is required. This extends a total access time for fetching and storing data.

(e) The prior art tends to fill each function figure with as much information as possible to shorten a design model processing time. Consequently, each function figure is complicated to make the management of the design model difficult.

To solve these problems, an object of the present invention is to provide a graphic data processor that enables a user to check and correct the whole of a product design model, to thereby quickly complete a designing process that is the center of product manufacturing.

Figure 1:
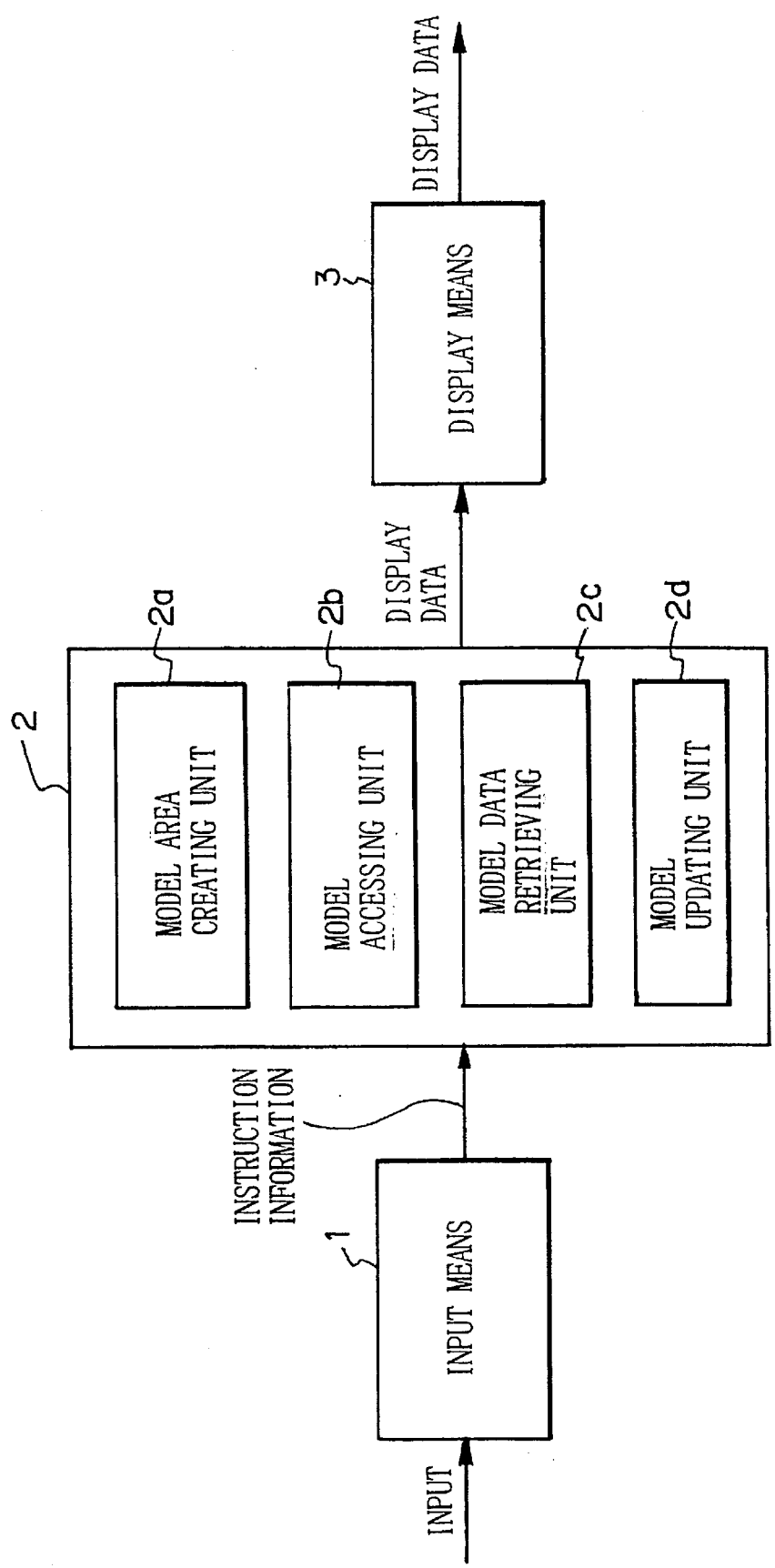
FIG. 1 is a block diagram showing the basic arrangement of a graphic data processor according to the present invention.

FIG. 1 shows the basic arrangement of a graphic data processor employing a CAD system, according to the present invention.

The graphic data processor comprises input means 1, model managing means 2, and display means 3.

The input means 1 receives an instruction through input devices.

The model managing means 2 includes a model area creating unit 2a, a model accessing unit 2b, a model data retrieving unit 2c, and a model updating unit 2d.

The model area creating unit 2a secures a model area for holding a design model composed of hierarchical figures and formats the model area into top layers (function figures), lower layers included in each of the top layers, figure groups included in each of the lower layers, and figures included in each of the figure groups. Each of the figures involves a figure area mask, attributes, geometric information, and letter train information.

The model accessing unit 2b fetches an existing design model from an external storage unit and puts it in the formatted model area in a single access operation, or transfers data from the model area to the external storage unit in a single access operation.

The model data retrieving unit 2c retrieves data units from the formatted hierarchical data in the model area.

The model updating unit 2d adds new function figures, layers, area masks, attributes, geometric information, and letter train information to the formatted model area, and corrects a design model fetched by the model accessing unit 2b.

The display means 3 has buffering means for buffering data from the model managing means 2 according to the colors, kinds, and characteristics of the data in order to display the data with minimum access time.

The structure of the model area corresponds to the structure of design model data stored in the external storage unit. The above three means cooperate with one another to create a design model and correct an existing design model at high speed.

This invention formats a product design model into hierarchical figures and stores them in the model managing means 2. When an instruction is given through the input means 1, the invention retrieves necessary data according to design models, function figures, layers, figure groups, and figures. Consequently, the invention quickly finishes frequent screen operations involving partial enlargement and panning.

This invention transfers a product design model between an external file and a temporary file in a single operation, to shorten a processing time.

This invention enables an operator to quickly check and correct the whole of a product design model on a display unit.

This invention effectively manages product design models one by one without preparing complicated parts drawings.

An embodiment of the present invention will be explained with reference to FIGS. 2 to 18. Through these figures, like reference marks represent like parts.

Figure 2:
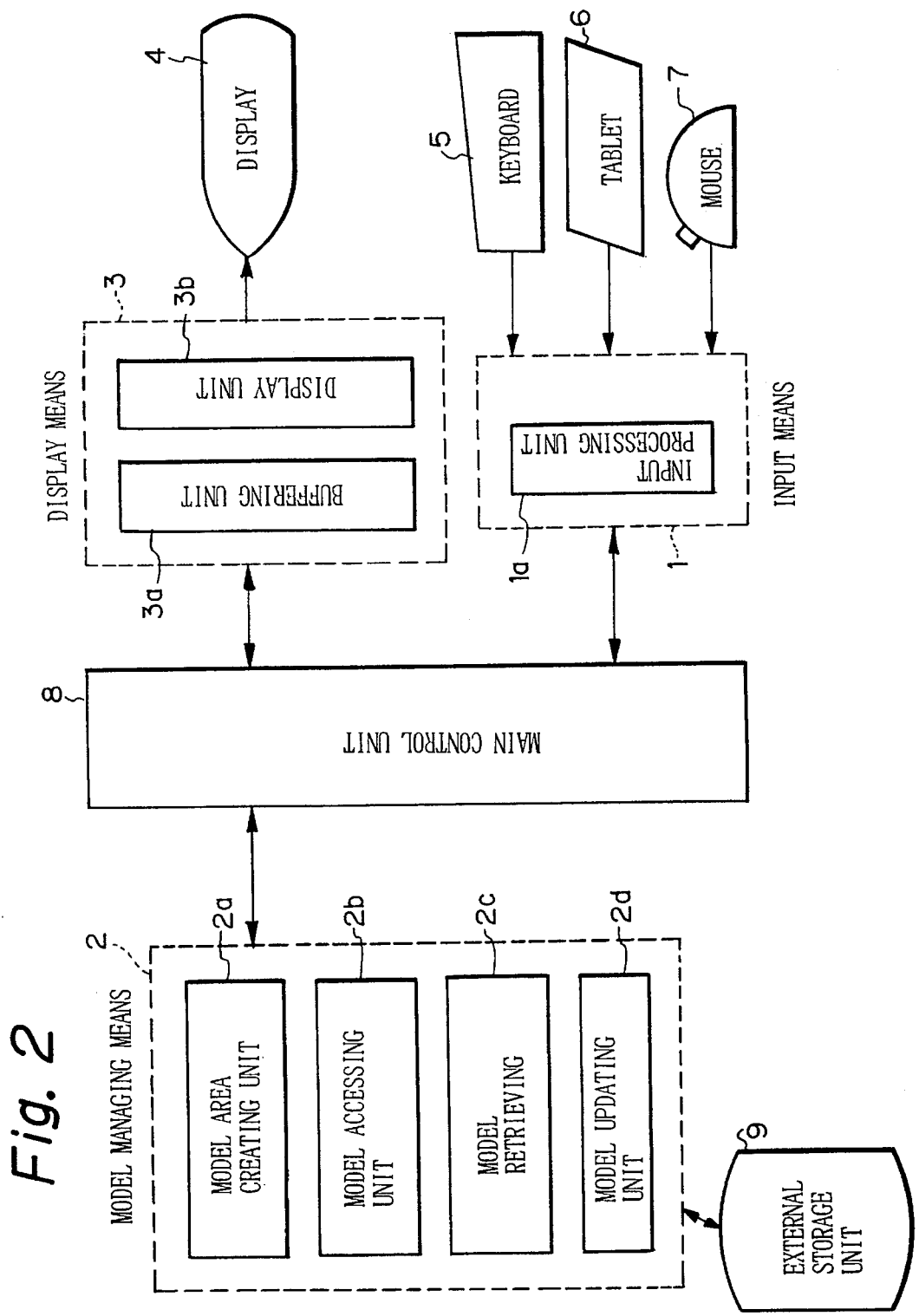
FIG. 2 is a block diagram showing a graphic data processor according to an embodiment of the present invention.

FIG. 2 is a block diagram showing a graphic data processor according to the embodiment. Input means 1 has an input processing unit 1a, which processes instructions provided through a keyboard 5, a tablet 6, and a mouse 7. Model managing means 2 has a model area creating unit 2a, a model accessing unit 2b, a model data retrieving unit 2c, and a model updating unit 2d. Display means 3 has a buffering unit 3a for temporarily storing data to be displayed and a display unit 3b for actually displaying the data. A main control unit 8 carries out overall control. An external storage unit 9 stores a plurality of design files.

Operations of this graphic data processor when handling data for the printed board of FIG. 19 will be explained.

Figure 3:
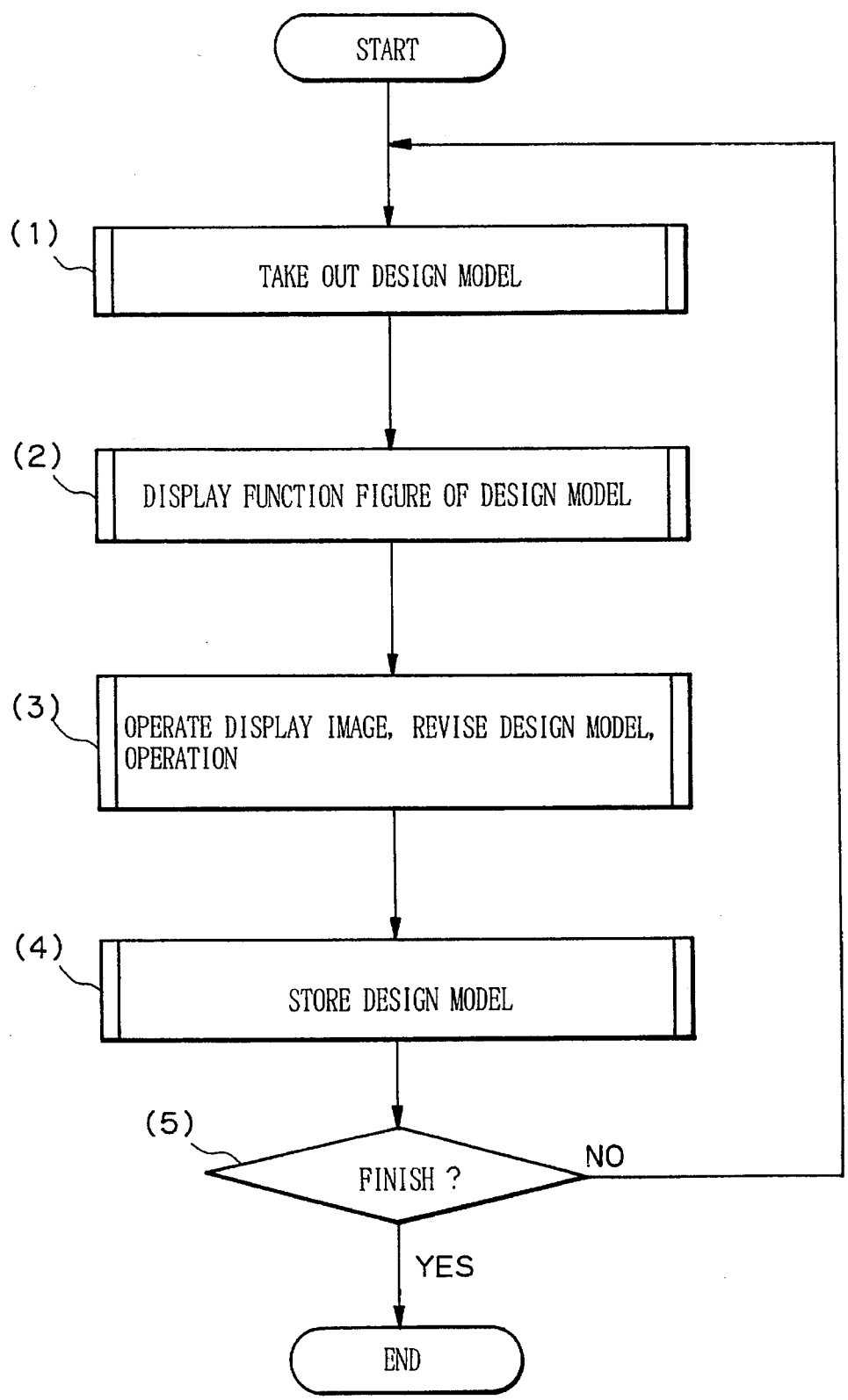
FIG. 3 is a flowchart showing basic operations of the embodiment.

Basic operations of the graphic data processor will be explained at first with reference to a flowchart shown in FIG. 3.

After that, the details of steps 1 to 5 of the flowchart of FIG. 3 will be explained with reference to flowcharts shown in FIGS. 4 to 7.

The input processing unit 1a of the input means 1 of FIG. 2 receives input data through the keyboard 5, tablet 6, and mouse 7.

As shown in FIGS. 22 (A) through 22 (C) positional data provided by the tablet 6 or the mouse 7 are converted into the design model's coordinates and are transferred to the respective units of the model managing means 2. FIG. 22 shows relations between display coordinates and physical coordinates. In the figure, a display screen 2 overlaps a display screen 1. A display coordinate system 1 on the screen 1 and a physical coordinate system 1 are convertible into each other. A display coordinate system 2 on the screen 2 and a physical coordinate system 2 are convertible into each other. Namely, each screen has its own display coordinate system, and each function figure has its own physical coordinate system.

Figure 9A:
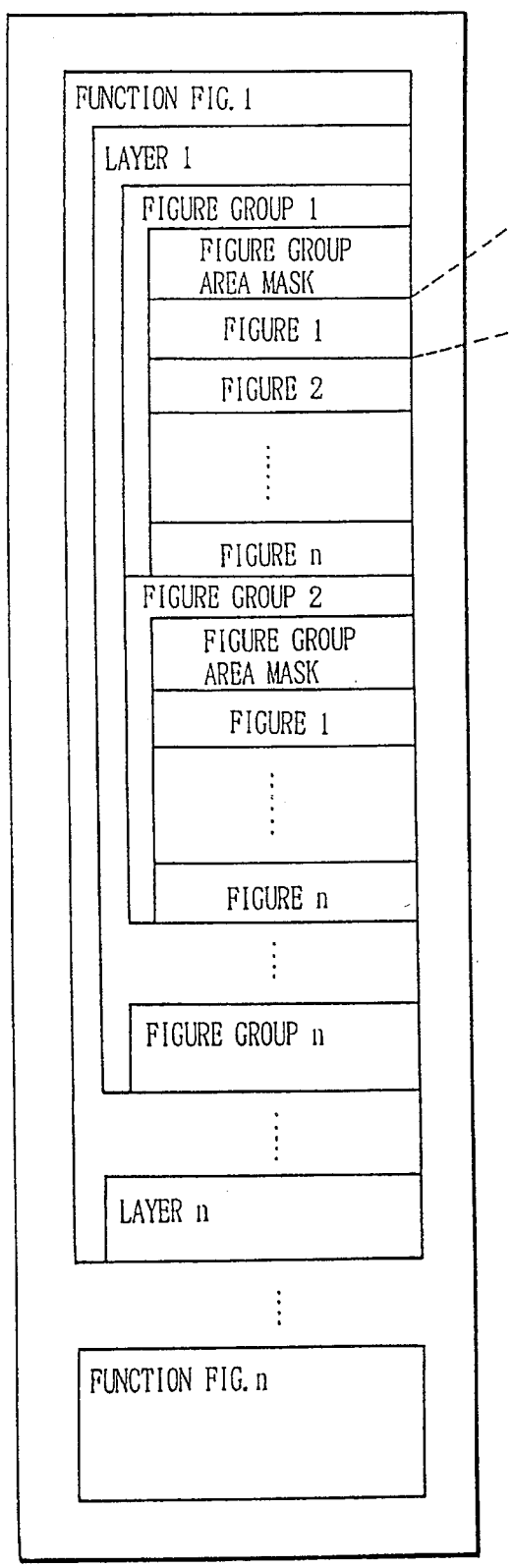
FIGS. 9 (A) through 9 (B) are views explaining a design model managed in a design model area.
Figure 9B:
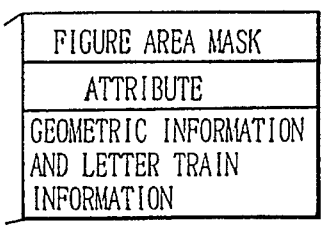
Figure 10A:
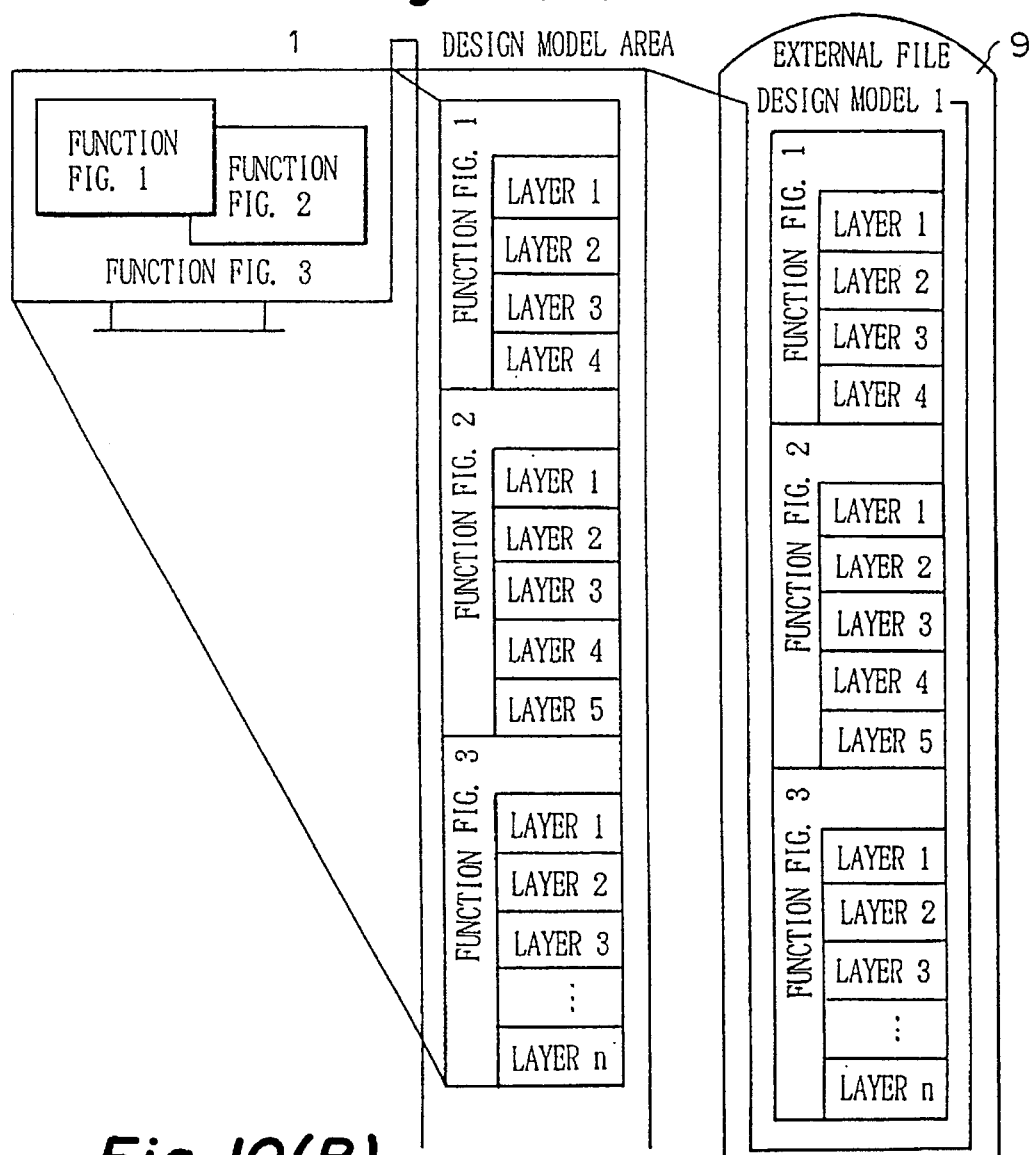
FIGS. 10 (A) and 10 (B) are views showing relations among a displayed design model, a design model held in the design model area, and a design model stored in an external file.
Figure 10B:
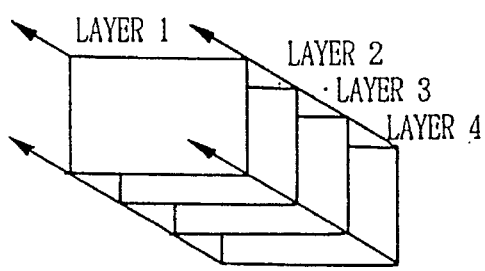
Figure 11A:
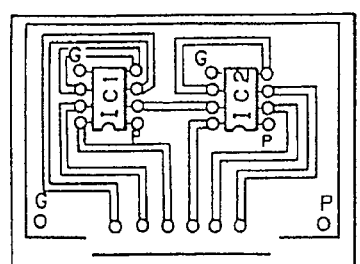
FIGS. 11 (A) through 12 (D) are views showing a function figure and layers.
Figure 11B:
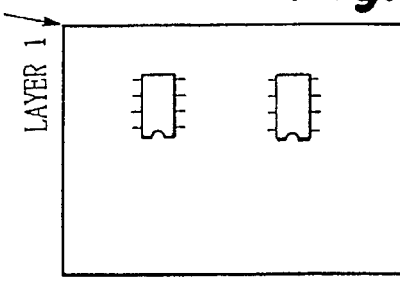
Figure 11C:
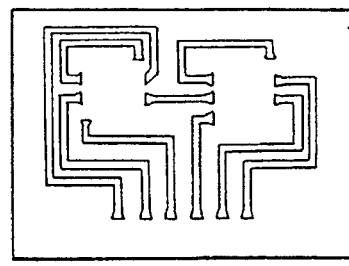
Figure 11D:
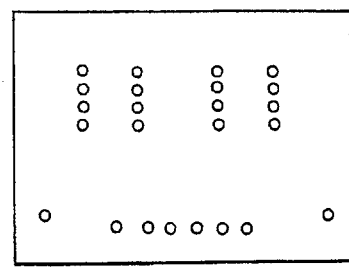
Figure 11E:
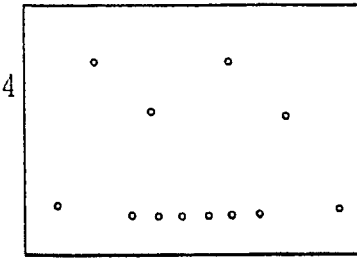
Figure 11F:
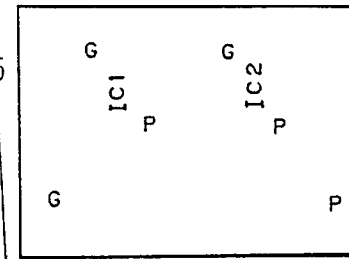
Figure 11G:
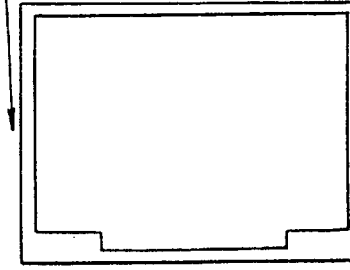
Figure 12A:
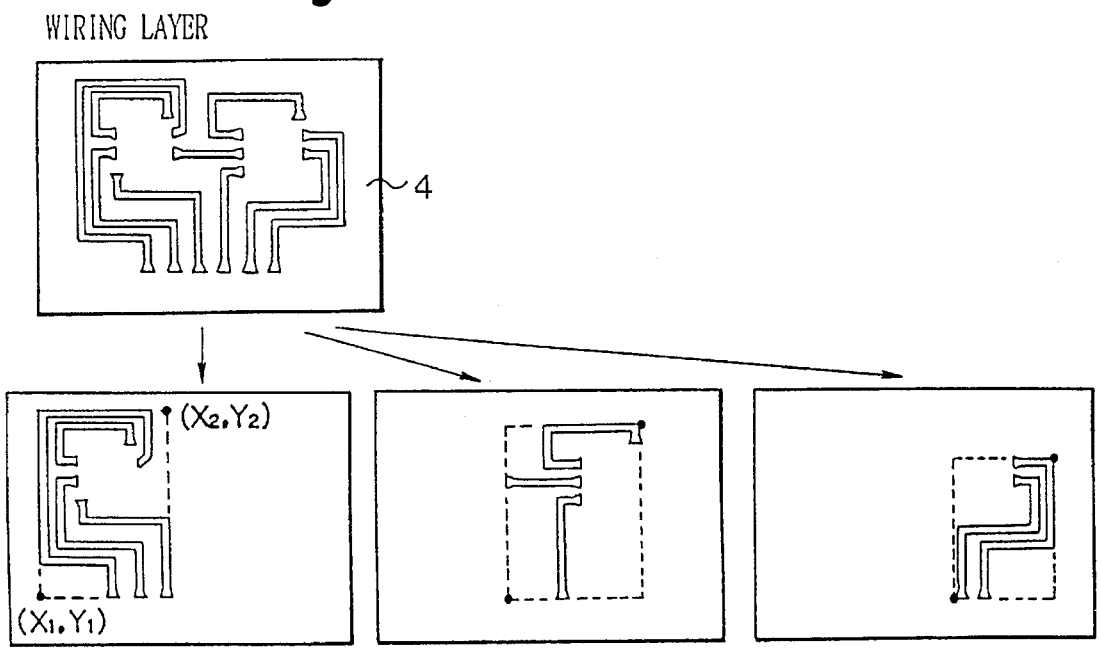
FIGS. 12 (A) through 12 (D) are views showing a two-dimensional figure including figure group area masks and figure area masks.
Figure 12B:
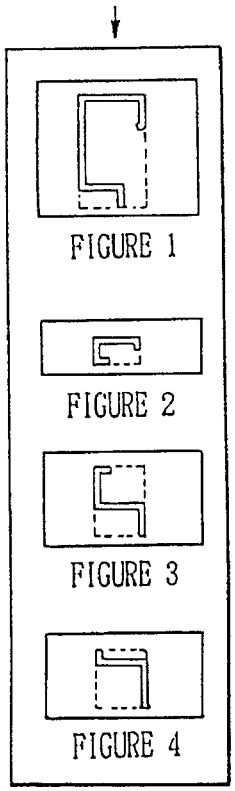
Figure 12C:
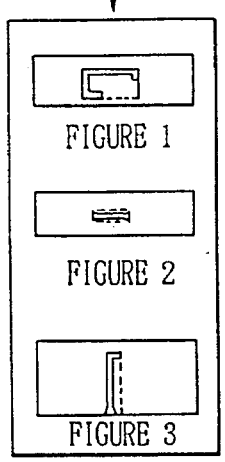
Figure 12D:
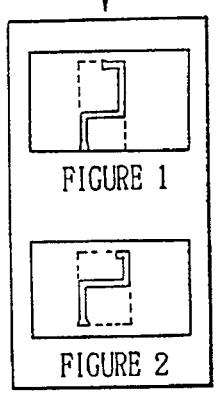

The model area creating unit 2a secures a model area for storing a design model, and when a new design model is created, formats the area for the new design model as shown in FIGS. 9 (A) and 9 (B).

A function figure represents a function of a product. For example, a function figure may represent a printed board. Each function figure manages layers.

Each layer manages figure groups, and each figure group manages figures. Namely, each figure group has area information, i.e., a figure group area mask covering the figures included.

Each figure comprises geometric information, letter train information, area information (a figure area mask), and attributes. The geometric information relates to the shape of the figure such as a line, circle, plane, and solid. The attributes relate to displaying, non-displaying, retrieval, non-retrieval, shape (linear, circular, arc, polygonal, or characters), the width of a line, the kind of the line (continuous, dotted, dot-and-dash), color, etc.

Each area mask indicates an area (coordinates) where a corresponding figure group or a figure is located.

In FIGS. 11 (A) through 11 (G), a function FIG. 40 representing the printed board comprises hierarchical layers such as a parts layer 41, a wiring layer 42, a resist layer 43, a hole layer 44, a letter layer 45, and an outer layer 46. Each layer involves figure groups. For example, the wiring layer 4 shown in FIG. 12 comprises three figure groups, which include four, three, and two figures, respectively.

In FIGS. 12 (A) through 12 (D), each figure is two-dimensional, and therefore, the position of a figure group or a figure is represented with an area mask indicating a rectangle defined by two diagonal points (X1, Y1) and (X2, Y2).

The external file, i.e., the external storage unit 9 stores a plurality of model areas each being formatted as explained above. Each of the model areas contains a product design model, which is transferred between the design model area of the graphic data processor and the external file.

The model accessing unit 2b finds a required design model among the design models stored in the external storage unit 9 according to an instruction provided through the input means 1 and transfers the design model found to the model area secured by the model area creating unit 2a in a single access operation. The model accessing unit 2b can transfer design model data from the model area to the external storage unit 9 in a single access operation.

The model data retrieving unit 2c retrieves data units from the design model data held in the model area, according to a given instruction and the function figures, layers, area masks, attributes, and geometric information of the design model data.

The model updating unit 2d adds new function figures, layers, figures, geometric information, area masks, and attributes to the model area, or corrects the design model data fetched by the model accessing unit 2b.

The buffering unit 3a of the display means 3 buffers data to be displayed according to the colors, kinds, and characteristics (linear, circular, polygonal, or characters) of the data.

The display unit 3b displays the data buffered in the buffering unit 3a according to display order.

The keyboard 5 has letter keys for entering the name of a design model or of a function figure, numeric keys for entering numbers necessary for creating or correcting displayed data, and execution buttons for entering processing instructions.

The tablet 6 and mouse 7 are used for specifying a figure in a displayed design model and providing screen position data.

The main control unit 8 controls the means and units mentioned above throughout operations.

The external storage unit 9 comprises, for example, a magnetic disk unit for storing product design models.

Operations of the embodiment will be explained with reference to the flowcharts.

Firstly, basic operations of the embodiment will be explained with reference to FIG. 3.

In step (1), an operator enters the name of a required design model with the keyboard 5.

In step (2), the operator specifies, with the tablet 6 or the mouse 7, a position where a function figure of the design model is to be displayed.

In step (3), the operator moves, enlarges, or reduces the displayed function figure and corrects, if necessary, elements of the figure.

In step (4), the operator uses the keyboard 5 to transfer the design model data to the external storage unit 9.

In step (5), the operator enters "yes" with the keyboard 5 to finish the checking and correcting processes of the design model, or "no" to repeat the processes from the step (1).

Figure 4:
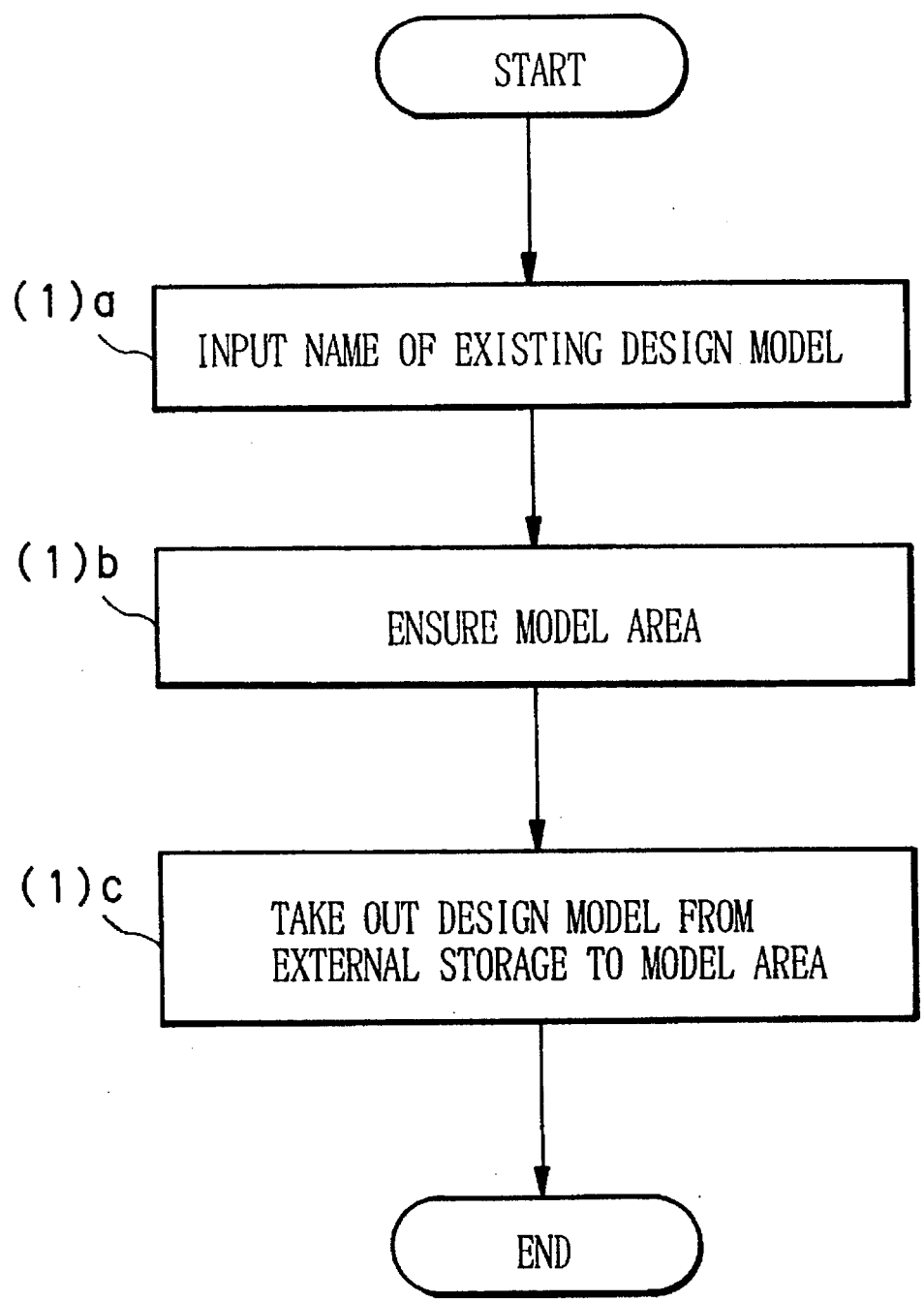
FIG. 4 is a flowchart showing the details of step 1 of FIG. 3.

The details of the step (1) of FIG. 3 will be explained with reference to FIG. 4.

In step (1)a, the operator enters the name of a required design model with the keyboard 5. The input processing unit 1a receives the entered data and transfers it to the model area creating unit 2a.

In step (1)b, the model area creating unit 2a secures an area for holding design model data corresponding to the entered name.

In step (1)c, the model accessing unit 2b fetches the required design model data out of the external storage unit 9 and puts the data into the secured area in a single access operation.

Thereafter, control is handed over to the main control unit 8, which waits for the next instruction.

Figure 5:
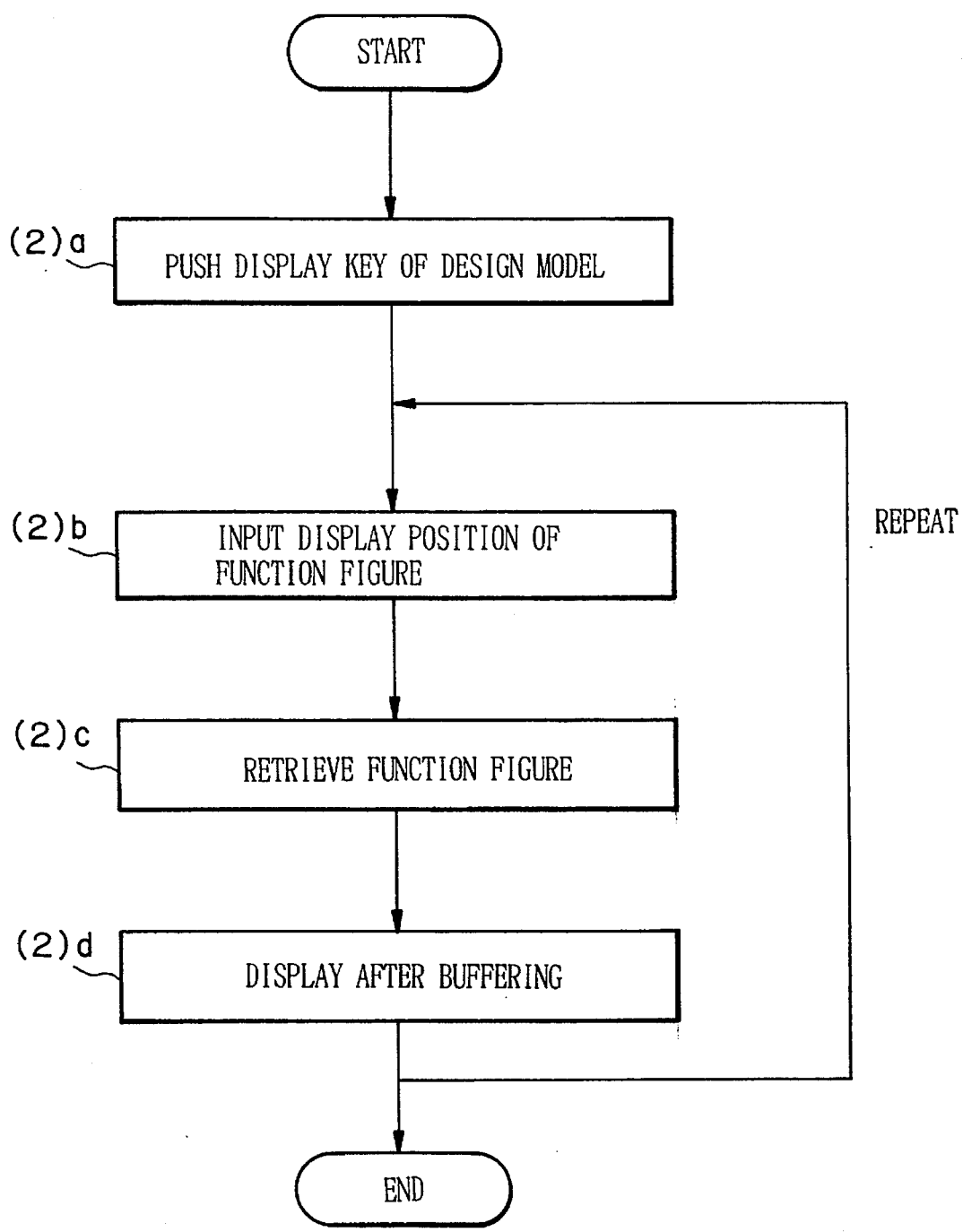
FIG. 5 is a flowchart showing the details of step 2 of FIG. 3.

The details of the step (2) of FIG. 3 will be explained with reference to FIG. 5.

In step (2)*a*, the operator pushes a design model display key on the keyboard 5.

In step (2)*b*, the operator uses the tablet 6 or the mouse 7 to specify the displaying position of a function figure of the design model. The input processing unit 1*a* converts the entered positional data into coordinates on a coordinate system of the design model and transfers them to the model data retrieving unit 2*c*.

In step (2)*c*, the model data retrieving unit 2*c* checks the attributes of figures as shown in FIG. 9 to retrieve required figures and informs the buffering unit 3*a* of the memory addresses of the retrieved figures to be displayed.

In step (2)*d*, the buffering unit 3*a* fetches figure data according to the addresses provided by the model data retrieving unit 2*c* and holds the data according to colors. The display unit 3*b* provides the display 4 with the display data according to the order of buffering.

Thereafter, control is handed over to the main control unit, which waits for the next instruction.

Figure 6:
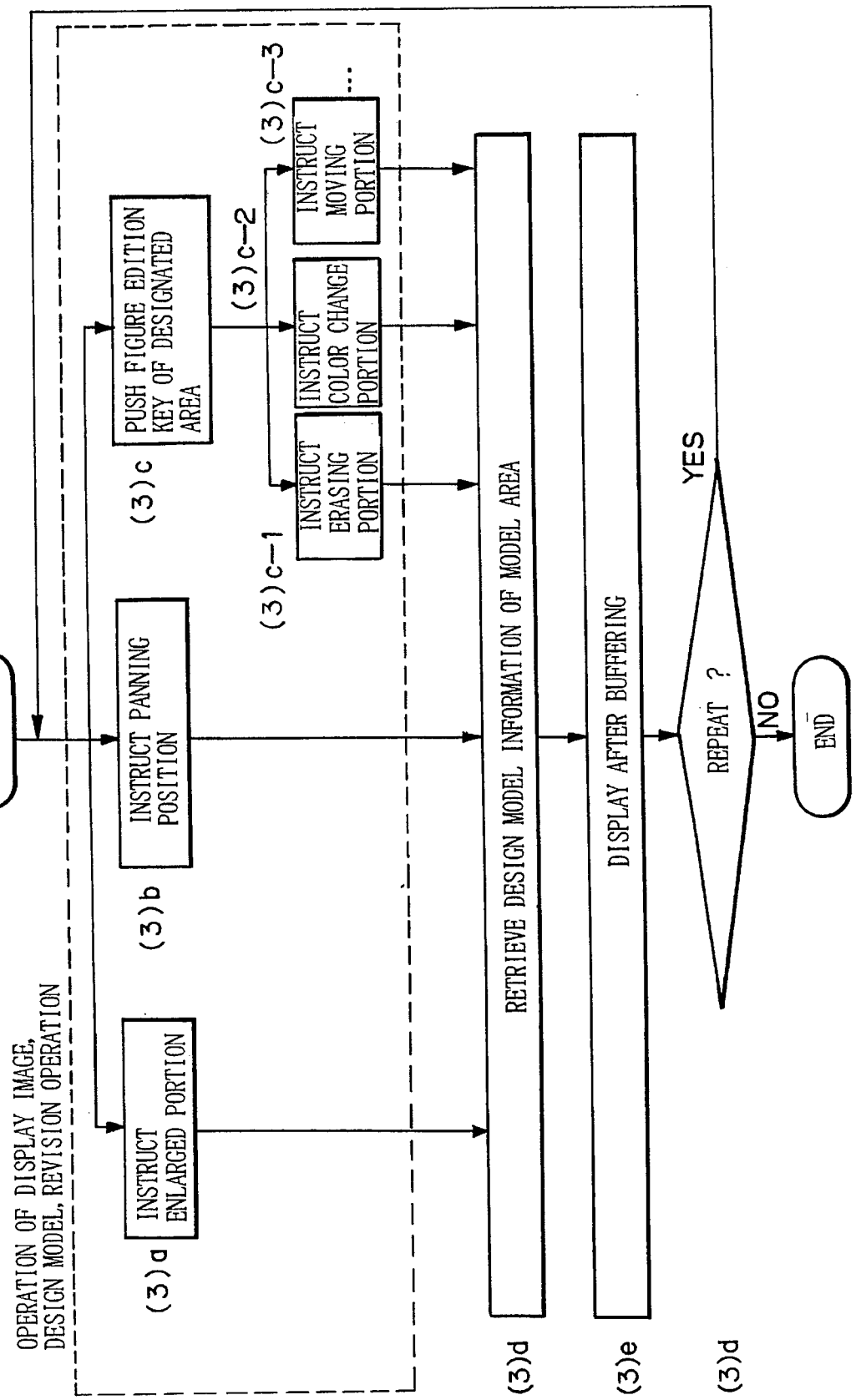
FIG. 6 is a flowchart showing the details of step 3 of FIG. 3.

The details of the step (3) of FIG. 3 will be explained with reference to FIG. 6.

In step (3)*a*, the operator uses the tablet 6 or the mouse 7 to specify a portion to be enlarged on the function figure displayed in the step (2). The input processing unit 1*a* converts the coordinates of the specified position into the coordinates of the design model and transfers them to the model data retrieving unit 2*c*. Then, the flow goes to step (3)*d*.

In step (3)*b*, the operator uses the tablet 6 or the mouse 7 to specify a panning position. The input processing unit 1*a* converts the coordinates of the specified position into the coordinates of the design model and transfers them to the model data retrieving unit 2*c*. Then, the flow goes to the step (3)*d*.

In step (3)*c*, the operator pushes a figure editing key and selects a delete key, or a color change key, or a move key on the keyboard 5.

In step (3)*c*-1, the operator uses the tablet 6 or the mouse 7 to specify a part or an element to be deleted from the function figure. The input processing unit 1*a* converts the coordinates of the specified position into the coordinates of the design model and transfers them to the model data retrieving unit 2*c*. Then, the flow goes to the step (3)*d*.

In step (3)*c*-2, the operator uses the tablet 6 or the mouse 7 to specify a part or an element whose color is to be changes in the function figure. Then, the same processes as in the step (3)*c*-1 are carried out.

In step (3)*c*-3, the operator uses the tablet 6 or the mouse 7 to specify a part or an element to be moved in the function figure. Then, the same processes as in the step (3)*c*-1 are carried out.

In the step (3)*d*, the model data retrieving unit 2*c* checks the model area according to the information obtained in one of the steps (3)*a*, (3)*b*, and (3)*c*, and informs the buffering unit 3*a* of the memory addresses of target figure groups or of target figures.

The details of the retrieving process of the step 3(*d*) will be explained with reference to FIGS. 13 to 15.

Figure 13A:
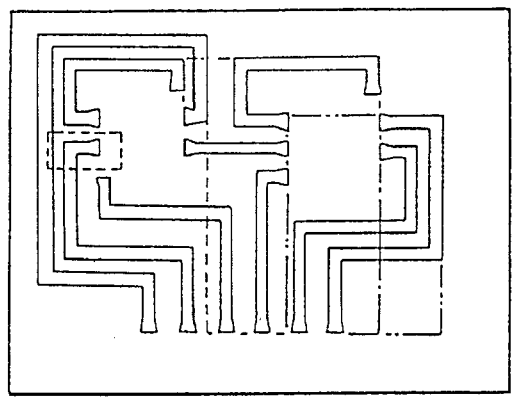
FIGS. 13 (A) through 13 (C) are views explaining the retrieval of a figure to be enlarged.
Figure 13B:
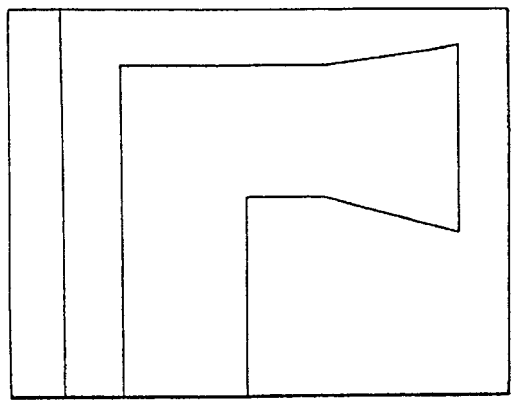
Figure 13C:
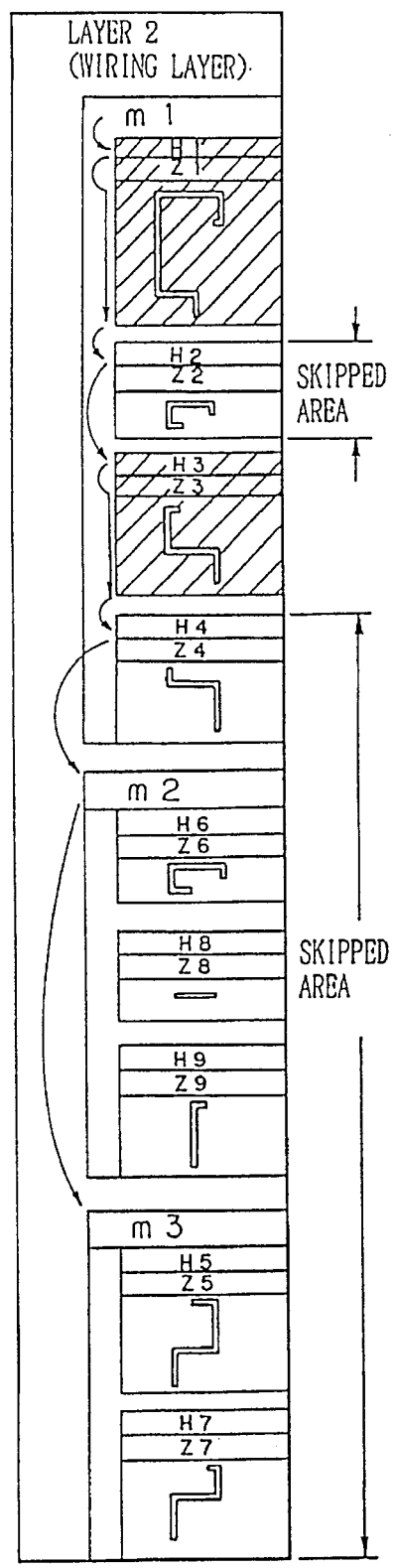
Figure 14A:
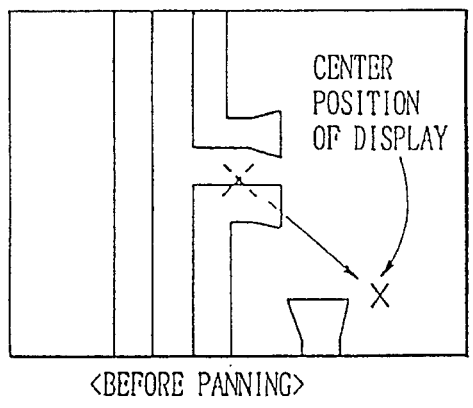
FIGS. 14 (A) through 14 (D) are views explaining the panning of a figure.
Figure 14B:
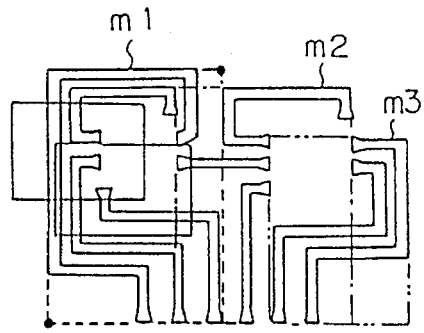
Figure 14C:
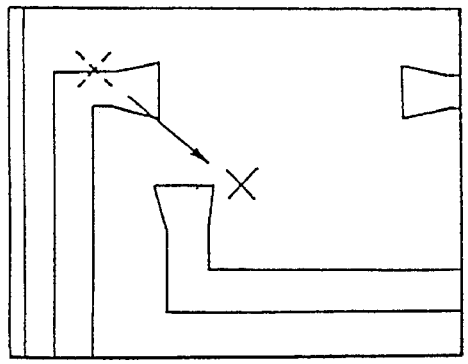
Figure 14D:
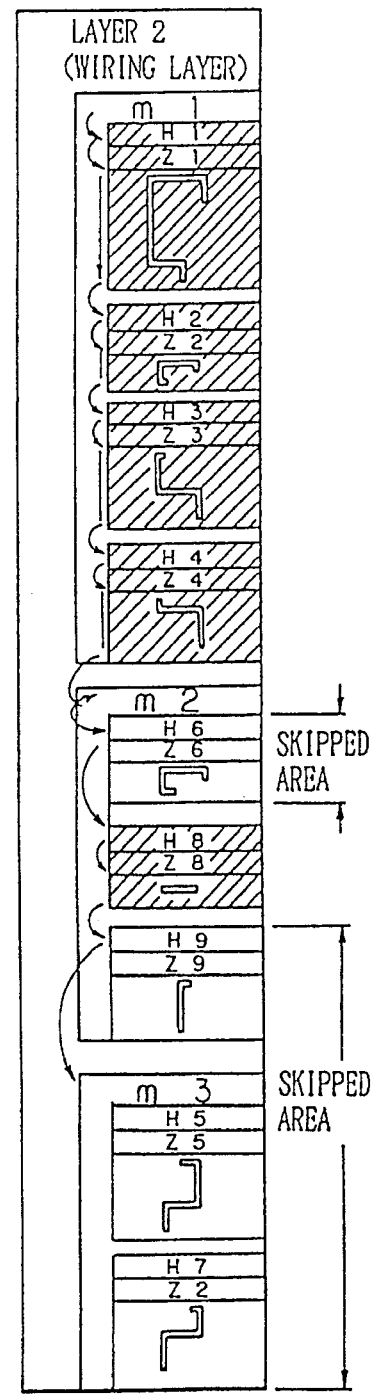

FIGS. 13 (A) through 13 (C) explain the searching and retrieving of figure group area masks according to the coordinates obtained in the step (3)*a* for enlargement. A reference mark Zn is a figure, Hn is a figure area mask, and Mn is a figure group area mask. A figure group or a figure that does not include the coordinates of the part to be enlarged is skipped.

If a figure group area mask containing the coordinates of the part to be enlarged is found, figure area masks in the figure group are searched for figures that fall in the part to be enlarged. When the figure search in this figure group is complete, another figure group area mask is searched. This search operation is carried out throughout the function figure in question, to retrieve all figures that fall in the part to be enlarged.

After that, the memory addresses of the retrieved figures are informed to the buffering unit 3*a*. Then, the flow goes to step (3)*e*.

FIGS. 13 (A) through 14 (D) the searching and retrieving of figure group area masks according to the coordinates obtained in the step (3)*b* for panning.

If a figure group area mask containing the coordinates of the part to be panned is found, figure area masks in the figure group are searched for figures that fall in the part to be panned, similar to the enlargement case. After the completion of the figure search, the memory addresses of the retrieved figures are informed to the buffering unit 3*a*. Then, the flow goes to the step (3)*e*.

Figure 15A:
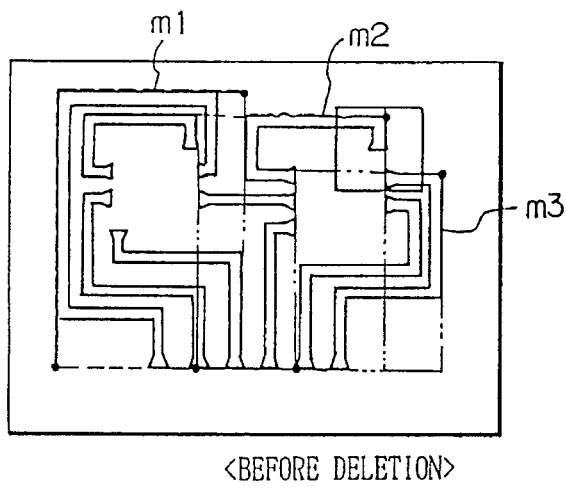
FIGS. 15 (A) through 15 (C) are views explaining the partial deletion of a figure.
Figure 15B:
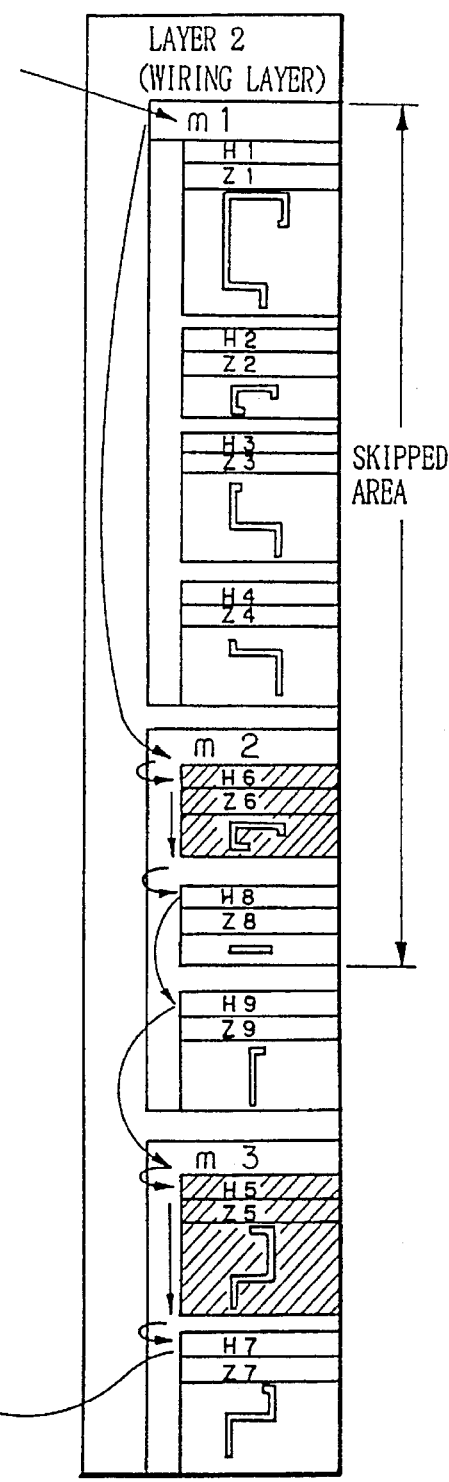
Figure 15C:
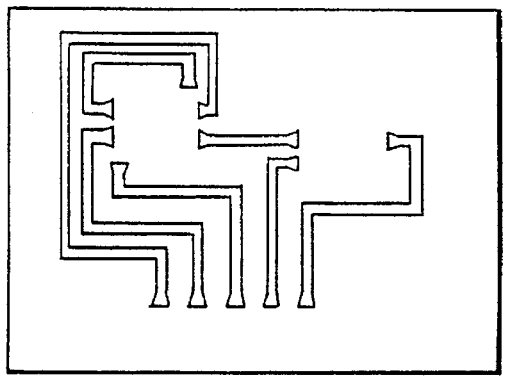

FIGS. 15 (A) through 15 (C) explain the searching and retrieving of figure group area masks according to the coordinates obtained in the step (3)*c*-1 for deletion. Similar to the previous examples, a reference mark Zn is a figure, Hn is a figure area mask, and Mn is a figure group area mask.

If a figure group area mask containing the coordinates of the part to be deleted is found, figure area masks in the figure group are searched for figures that fall in the part to be deleted, similar to the previous cases.

After the completion of the figure search, the memory addresses of the retrieved figures are informed to the buffering unit 3*a*. Then, the flow goes to the step (3)*e*.

The color changing operation of the step (3)*c*-2 and the figure moving operation of the step (3)*c*-3 are carried out similar to the examples shown in FIGS. 13 to 15. After the completion of retrieval of figures, the step (3)*e* is carried out.

In the step (3)*e*, the buffering unit 3*a* buffers figure data according to the addresses provided by one of the steps (3)*a*, (3)*b*, and (3)*c* and the instruction entered by the operator.

The buffering unit 3*a* buffers the figure data according to color information specified by the attributes in the figure data. The figures to be deleted of the step (3)*c* are displayed in black. Once the figure data are buffered, the display unit 3*b* is started. The display unit 3*b* provides the display 4 with the data held in the buffering unit 3*a* in the order of buffering. Consequently, results of the above operations are quickly processed and displayed.

In step (3)*f*, the screen operations and design model corrections are repeated, if necessary.

Figure 7:
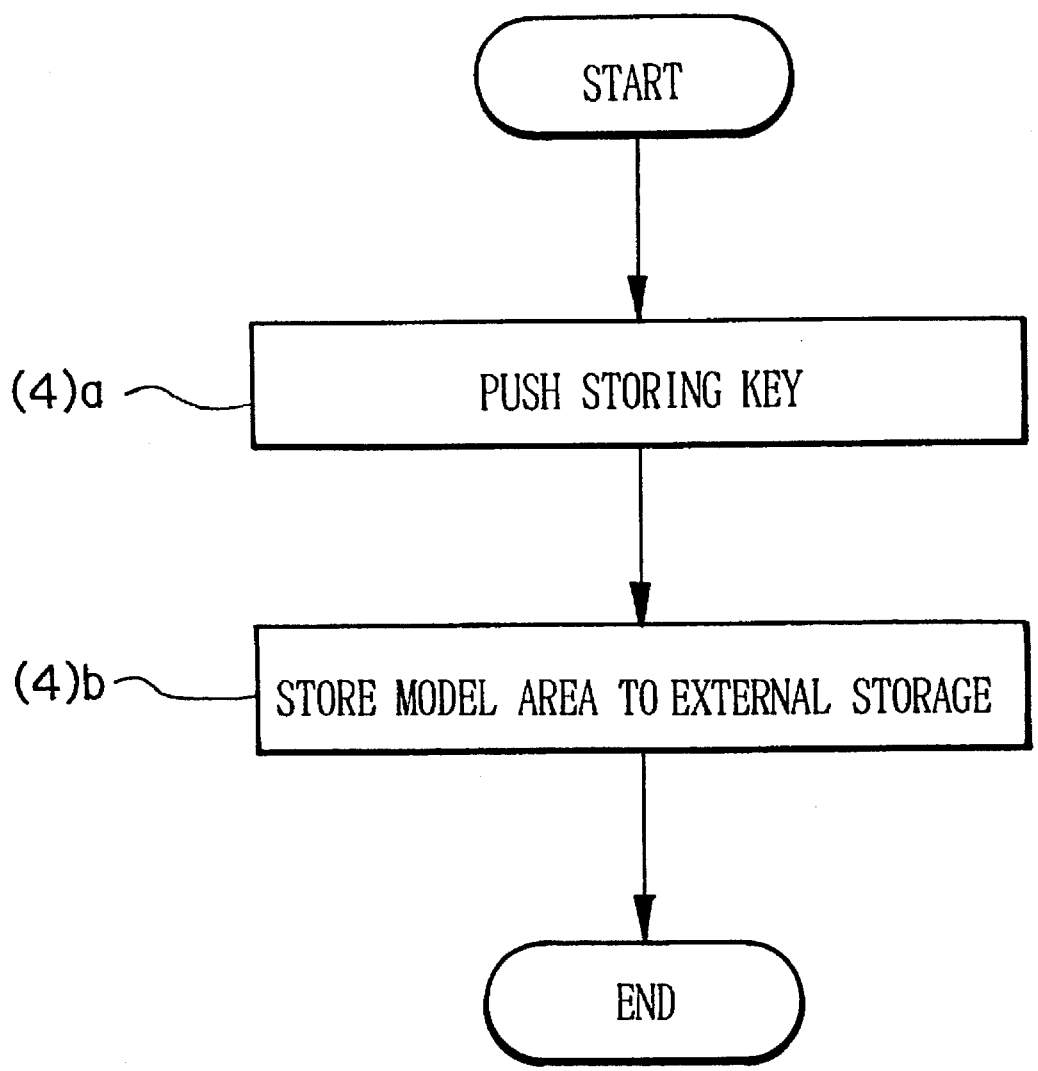
FIG. 7 is a flowchart showing the details of step 4 of FIG. 3.

The details of the step (4) of FIG. 3 will be explained with reference to FIG. 7.

In step (4)*a*, the user enters a store instruction with the keyboard 5. The input means 1 transfers the instruction to the model accessing unit 2*b*.

In step (4)*b*, the model accessing unit 2*b* transfers the design model data from the model area to the external storage unit 9 in a single access operation. This completes the storing process.

In this way, the design model data in the model area are corrected, or new design model data are created in the model area. The design model data are corrected and displayed according to requirements at high speed.

The above examples handle a two-dimensional model such as a circuit wiring pattern. The figure group area masks and figure area masks shown in FIGS. 9 (A) and 9 (B) are applicable for three-dimensional data such as tubes shown in FIGS. 16 (A) through 16 (D). In this case, the area mask of each figure group or figure is specified by the center coordinates (X, Y, Z) and radius (r) of a sphere that includes the figure group or figure. Three-dimensional data, therefore, are processible similar to the two-dimensional data shown in FIGS. 12(A) through 12(D).

Figure 17:
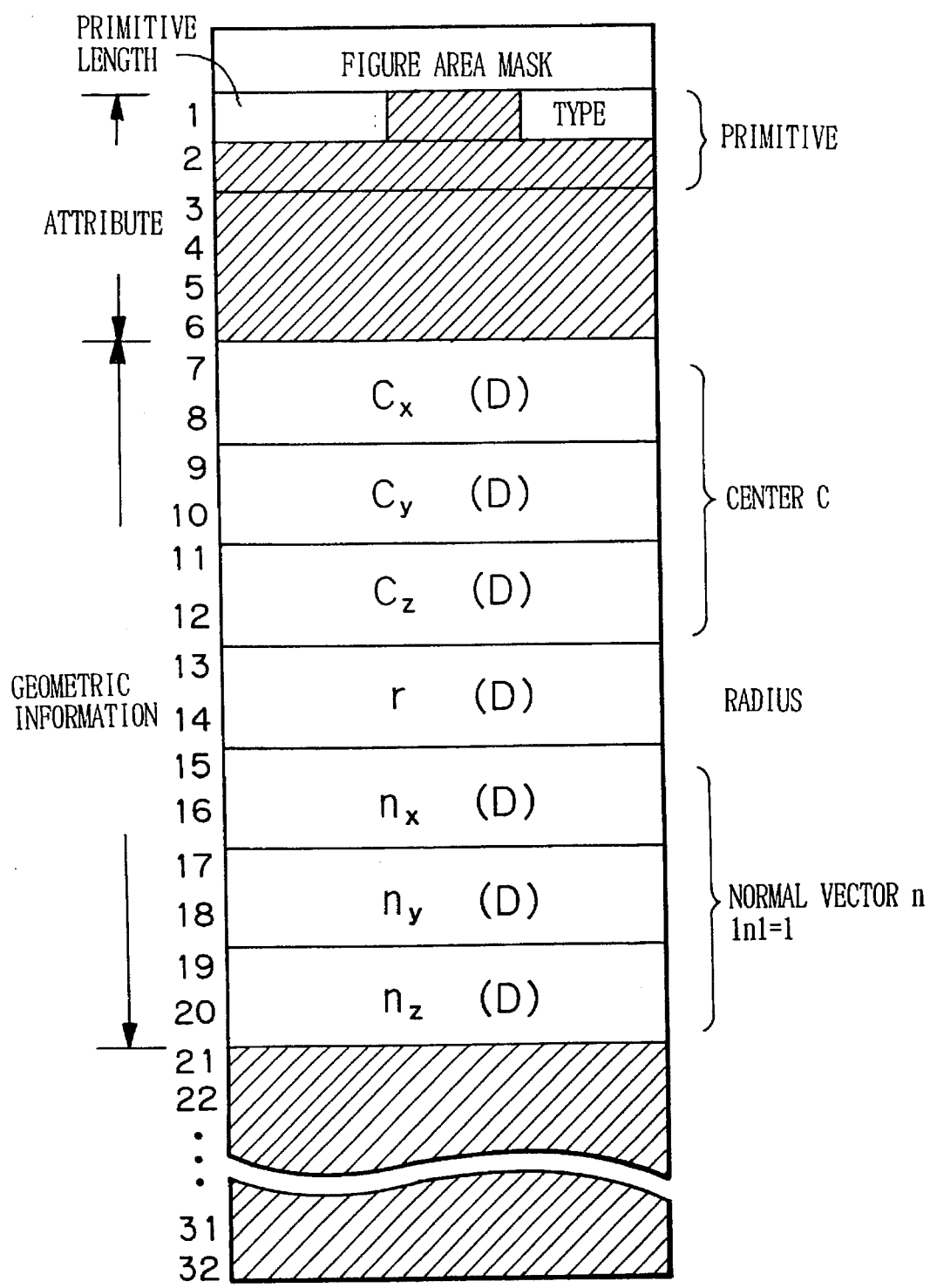
FIG. 17 is a view explaining a data format for a two-dimensional figure according to the embodiment.
Figure 19A:
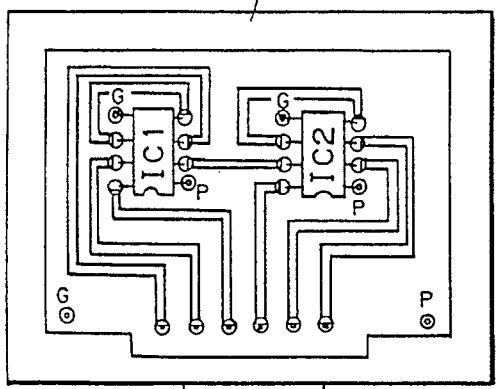
Figure 19B:
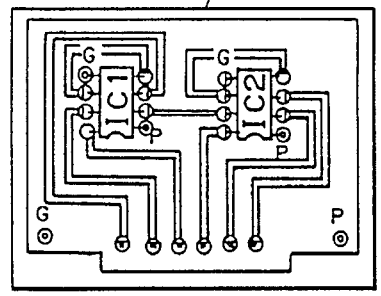
Figure 19C:
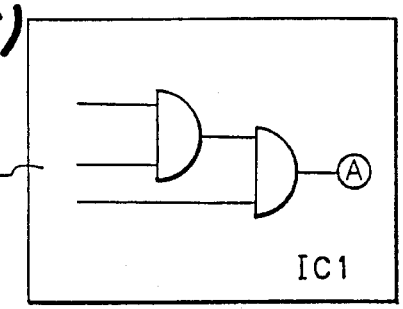
Figure 19D:
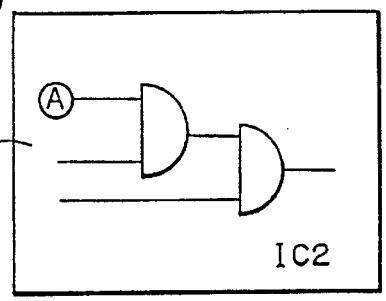

Figure data are storable in any form. For example, a two-dimensional figure may be stored as shown in FIG. 17, and a three-dimensional figure may be stored as shown in FIGS. 18(A) and 18(B) Each stored figure is represented with a figure area mask, attributes, and geometric information.

As explained above, the present invention enables a user to check and correct a product design model as a whole instead of function by function, to thereby quickly complete a designing process that is the center of product manufacturing.

We claim:

1. A graphic data processor employing a CAD system, comprising:

an external storage unit storing a structure of design model data;

input means for receiving an instruction through input devices;

model managing means, coupled to the input means and to the external storage unit, comprising:

a model area creating unit defining a model area of the model managing means and holding in the model area a design model comprising hierarchical figures, the model area creating unit formatting the design model in the model area into top layers, lower layers included in each of the top layers, figure groups included in each of the lower layers, and figures included in each of the figure groups, each of the figures comprising a figure area mask, attributes, geometric information, and letter train information, said model area creating unit accordingly producing a formatted design model, the model area holding formatted hierarchical figures comprising the design model data, a model accessing unit fetching an existing design model out of the external storage unit, storing the existing design model in the model area in a single access operation, and transferring data from the model area to the external storage unit in a single access operation, a model data retrieving unit retrieving the design model data from the model area for each of the formatted hierarchical figures, and a model updating unit adding new function figures, layers, area masks, attributes, geometric information, and letter train information to the model area, and correcting the existing design model fetched by the model accessing unit; and display means for displaying the formatted hierarchical figures and comprising buffering means for sorting the formatted hierarchical figures displayed on the display means according to colors, kinds, and characteristics of each of the formatted hierarchical figures to produce sorted figures and for organizing the sorted figures in the buffering means to display the design model data with minimum access time, wherein a structure of the model area corresponds to the structure of design model data stored in the external storage unit and the input means, the model managing means and the display means communicate with one another to create the design model and to correct an existing design model at high speed.

2. The graphic data processor according to claim 1, wherein each of the figure groups comprises a header with a figure group area mask having coordinates specifying the position of the figure group, and each of the hierarchical figures comprises a header with a figure area mask having coordinates specifying the position of the figure.

3. The graphic data processor according to claim 1, wherein the display means provides multiple windows for displaying the formatted hierarchical figures.

4. The graphic data processor according to claim 1, wherein the model data retrieving unit retrieves data from the model area by searching the figures group area masks and figure area masks in the model area.

5. The graphic data processor according to claim 1, wherein a two-dimensional figure in the model area is specified with two diagonal corner points (x1, y1; x2, y2) of a rectangle comprising the two-dimensional figure.

6. The graphic data processor according to claim 1, wherein a three-dimensional figure in the model area is specified with the center (x, y, z) and radius (r) of a sphere that includes the three-dimensional figure.

7. A method for processing product design models at high speed, said method comprising the steps of:

(a) storing a structure of design model data in an external storage in an external storage unit;

(b) receiving an instruction through input devices;

(c) defining a model area of a model managing unit and holding in the model area a design model comprising hierarchical figures;

(d) formatting by a model area creating unit the design model in the model area into top layers, lower layers included in each of the top layers, figure groups included in each of the lower layers, and figures included in each of the figure groups, each of the figures comprising a figure area mask, attributes, geometric information, and letter train information;

(e) accordingly producing by said model area creating unit a formatted design model in a model area holding formatted hierarchical figures comprising the design model data;

(f) fetching by a model accessing unit an existing design model out of the external storage unit;

(g) storing by the model accessing unit the existing design model in the model area in a single access operation;

(h) transferring by the model accessing unit data from the model area to the external storage unit in a single access operation;

(i) retrieving by a model data retrieving unit the design model data from the model area for each of the formatted hierarchical figures;

(j) adding by a model updating unit new function figures, layers, area masks, attributes, geometric information, and letter train information to the model area;

(k) correcting by the model updating unit the existing design model fetched by the model accessing unit;

(l) displaying on a display the formatted hierarchical figures by sorting the formatted hierarchical figures displayed on the display according to colors, kinds, and characteristics of each of the formatted hierarchical figures to produce sorted figures and organizing the sorted figures to display the design model data with minimum access time, wherein a structure of the model area corresponds to the structure of design model data stored in the external storage unit and the input devices, the model managing unit and the display communicate with one another to create the design model and to correct an existing design model at high speed.

* * * * *

UNITED STATES PATENT AND TRADEMARK OFFICE
CERTIFICATE OF CORRECTION

PATENT NO. : 5,517,607
DATED : May 14, 1996
INVENTOR(S) : Naoki NISHIMURA et al.

It is certified that error appears in the above-indentified patent and that said Letters Patent is hereby corrected as shown below:

Col. 1, line 40, delete [includes].

Col. 2, line 44, change "through" to --and--;

line 51, change "12(D)" to --11(G)--;

line 63, change "19(D)" to --16(D)--;

line 67, "Figs. 18" begins a new paragraph.

Col. 5, line 22, insert --,-- after "22(c)".

Col. 7, line 11, change "1a" to --1a--;

line 36, change "1a" to --1a--;

line 51, change "changes" to --changed--.

Col. 8, line 16, change "13(A)" to --14(A)--;

line 16, insert --explain-- after "14(D)".

Col. 9, line 14, insert --.-- after "18(B)".

Signed and Sealed this

Third Day of December, 1996

Attest:

BRUCE LEHMAN

*Attesting Officer*  *Commissioner of Patents and Trademarks*